United States Patent [19]
Schneider et al.

[11] 3,942,896
[45] Mar. 9, 1976

[54] MEASURING MAGNIFIER WITH SPECIAL RETICLE

[75] Inventors: David Schneider, Lexington; Lewis Soares, Burlington, both of Mass.

[73] Assignee: Sweetheart Plastics, Inc., Wilmington, Mass.

[22] Filed: Nov. 6, 1974

[21] Appl. No.: 521,242

[52] U.S. Cl. .............. 356/171; 33/174 G; 250/568
[51] Int. Cl.² ....................................... G01B 11/02
[58] Field of Search ............ 356/171, 159; 250/568, 250/569, 560; 33/174 G

[56] References Cited
UNITED STATES PATENTS
3,546,778  12/1970  Lepkowski.................... 356/171 X

*Primary Examiner*—R. V. Rolinec
*Assistant Examiner*—Darwin R. Hostetter
*Attorney, Agent, or Firm*—Wolf, Greenfield & Sacks

[57]  ABSTRACT

A measuring device to determine whether the width of a printed bar falls within prescribed tolerances has a sleeve with a magnifying lens at one end and a reticle at the other end. The reticle is inscribed with indicia for providing an immediate visual indication of the magnitude of width of the bar.

22 Claims, 9 Drawing Figures

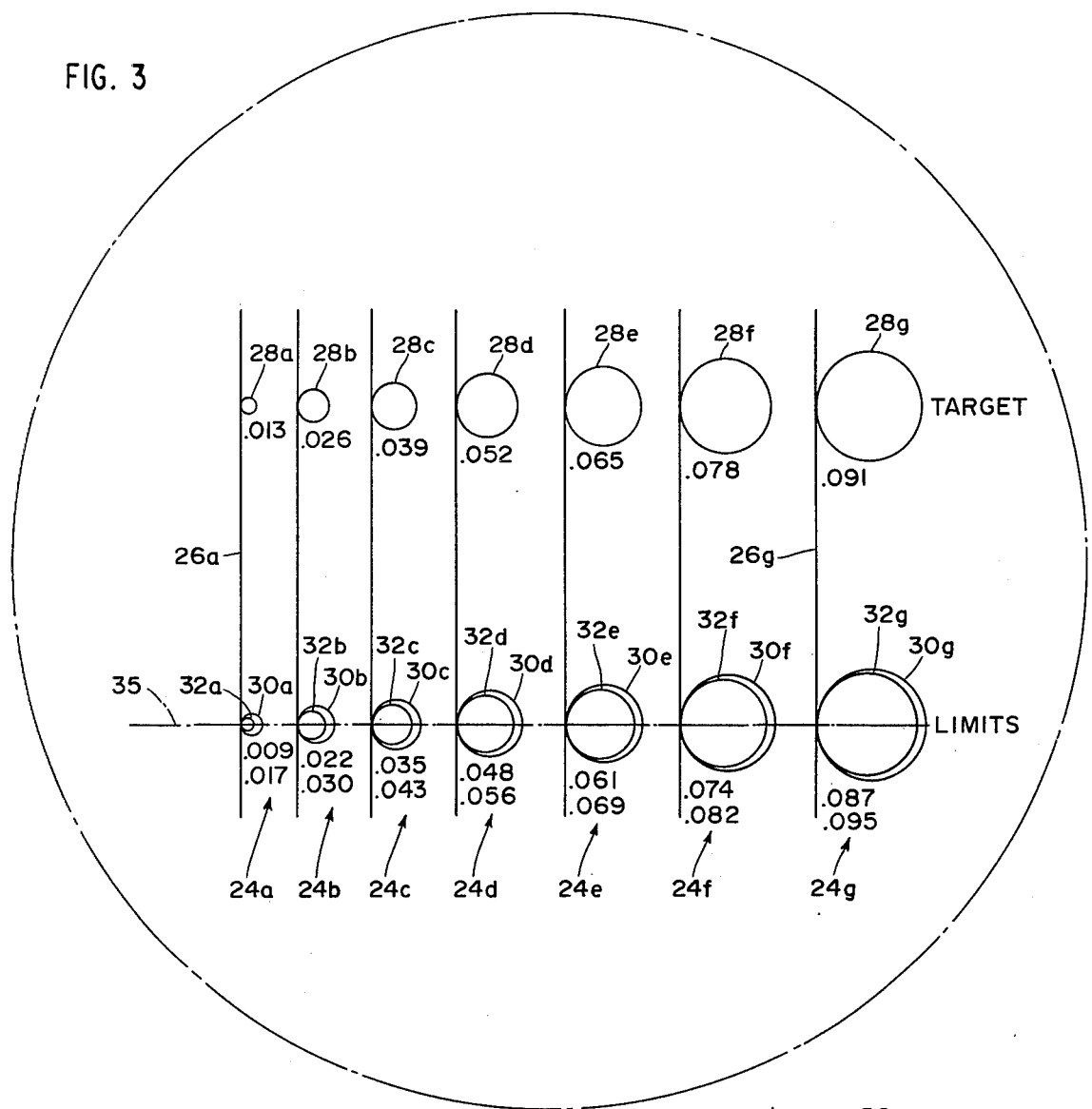

MEASURING MAGNIFIER WITH SPECIAL RETICLE

BACKGROUND OF THE INVENTION

Recently, a system known as the Universal Product Code (UPC) has been developed as an aid to supermarkets, their suppliers and other retailers. The system includes the provision of a symbol on each packaged item or on the item itself. The symbol is optically machine readable and consists of plurality of spaced bars of various thicknesses and spacings. The bars are "read" by an appropriate optical scanner, for example, at a checkout counter of a retail store. Each product is assigned a symbol which has a different configuration of lines and spaces than all other products. Each symbol corresponds to a special number or alphanumeric code associated with each particular product. The scanner output is coupled to an electronic logic system which can perform a variety of functions. For example, the logic system can operate a cash register-receipt printout device to compute the price of an item and add it to the bill. It may also be used to maintain inventory control as well as to reprice items without requiring each item itself to be remarked with the new price.

It is intended that the standard overall size of the complete symbol will correspond approximately to that of a postage stamp. However, the actual overall size of the symbol will vary depending on the size of the particular product or its package. For example, the size of the symbol may vary from between 85 percent to 200 percent of the standard or nominal size. The bars of the symbol are relatively thin and, when the symbol is of nominal size, will vary from approximately 0.013 to 0.052 inch in width, each line being an integer multiple of 0.013 inch in width. It is critical that the width of each of the bars falls within the acceptable tolerances in order that the scanning system may function effectively. For example, with a symbol of standard size a tolerance of ±0.004 inch in the width of a bar presently is believed to be acceptable. The acceptable tolerance in the width of a bar may vary as the size of the symbol varies from the standard. For example, in a symbol which is twice the size of the standard size and in which the bar widths will be an integer multiple of 0.026 inch, the acceptable tolerance will be greater.

It is an object of the invention to provide a device to enable the widths of the bars and spaces in the printed symbol to be checked easily and quickly.

SUMMARY OF THE INVENTION

The invention is incorporated in a measuring magnifier having a barrel, a lens at one end of the barrel and a reticle at the other end of the barrel. The reticle has markings thereon which include at least two geometric figures such as a pair of circles, a pair of triangles, a pair of lines, or other figures as will be described. In a preferred embodiment of the invention one of the figures in the pair may be smaller than the other, with the smaller figure being located within the larger figure. The two figures coincide at a reference location which may be a point of common tangency where the geometric figures are circles. Each of the figures in the pair is symmetrical about a line extending through the reference point and perpendicular to a reference line which may be drawn through the reference point. The distance from the reference point to the most distal part of the smaller of the figures corresponds to the minimum acceptable width of the bar being measured and the distance from the reference point to the most distal part of the larger of the figures corresponds to the maximum acceptable width of the bar. A reference line may be formed through the reference point and perpendicular to the line of symmetry to facilitate placement of the reference point directly on one edge of the bar whose width is being measured. With the reference point in precise alignment with one edge of the measured bar, it may be seen visually whether the other edge of the measured bar lies within the minimum/maximum dimensions of the pair of geometric figures. Numerical indicia may be associated with each pair of figures if desired to indicate their actual minimum/maximum dimensions. In addition, a third geometric figure may be associated with each pair of minimum/maximum geometric figures, the third figure being of a dimension corresponding to the ideal width of the bar being measured. When a third such geometric figure is employed it preferably is located so that it coincides with and extends from the reference line in the same direction as the maximum/minimum pair of geometric figures associated therewith.

In another embodiment of the invention the pair of geometric figures may consist of a pair of lines spaced from each other and both lines being spaced from the reference line, the more proximate of the pair of lines defining the minimum acceptable dimension and the more distal of the lines in the pair defining the maximum acceptable dimension.

In a further variant of the invention a plurality of pairs of minimum/maximum geometric figures are associated with a common reference line in which the pairs of geometrical figures are spaced along a direction which parallels the reference line.

It is among the primary objects of the invention to provide a quick, simple means to determine visually whether the widths and spaces of the bars in a UPC symbol fall within intended prescribed tolerances.

DESCRIPTION OF THE DRAWINGS

The various object and advantages of the invention will be understood more fully from the following further description thereof, with reference to the accompanying drawings wherein:

FIG. 3 is an enlarged plan illustration of the reticle and the indicia thereon;

FIG. 4 is an illustration of the manner in which the thickness of a bar may be determined in accordance with the invention;

FIG. 5 is an illustration of a variation of the invention;

FIG. 6 is an illustration of another embodiment of the invention;

FIG. 7 is an illustration of still another embodiment of the invention;

DESCRIPTION OF THE PREFERRED EMBODIMENT

Figure 1:
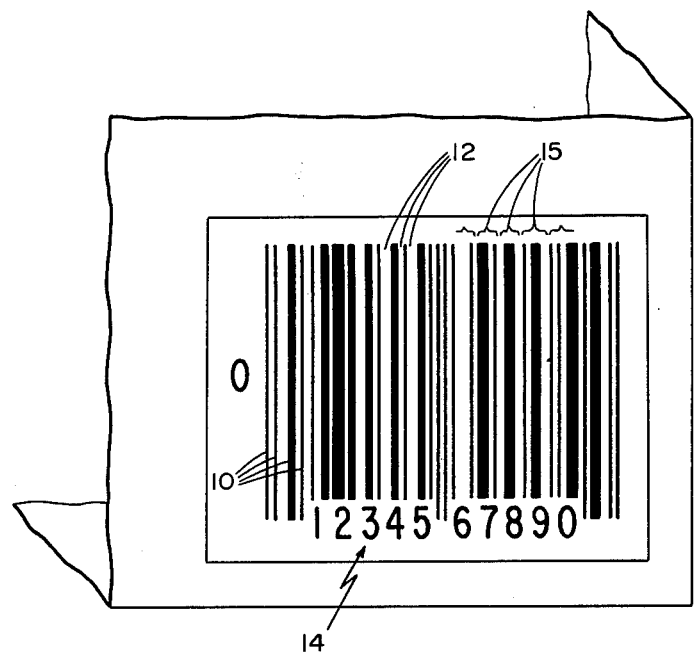
FIG. 1 illustrates a typical symbol used in the UPC system.

FIG. 1 shows a typical UPC machine-readable symbol as it may be imprinted directly on a portion of a box, label, container or other package. The symbol includes a plurality of alternating bars 10 and spaces 12, the bars and spaces 12 being of varying widths. The various widths of the bars 10 are selected so that they may be read optically by an appropriate optical scanner. The various bar and space widths correspond to digital information which identifies by code the particular product, the source of the product or the like. The symbol may also include alphanumeric indicia 14 corresponding to the information embodied in the configuration of bars 10.

In the present form of the UPC system, the symbol is divided into a plurality of adjacent regions 15, each of identical width, each region containing a selected bar-space configuration corresponding to one particular alphanumeric character. Each of these regions is composed of seven modular widths, each module ideally being 0.013 inch in a symbol of standard size. Thus, the total width of one of the regions 15 allocated to include various bars and spaces corresponding to a particular alphanumeric character is, ideally, 0.091 inch. The 0.091 inch region may be occupied by any of a variety of alternating bars and spaces. Each bar and/or space is an integer multiple of the 0.013 modular width. The system utilizes four different bar and/or space widths. Each of these widths is intended to be an integer multiple of the basic (or modular) width, with the finest bar or space having a width equal to the modular width. For example, with a symbol of standard size the bar and space widths are selected from a group including the most narrow width, equal to one module in width (0.013 inch), a second width of 0.026 inch, a third width of 0.039 inch and a fourth width of 0.052 inch.

In order for the system to function effectively, the width of the bars and spaces must remain within certain prescribed limits to enable the optical scanner to distinguish between each of the four different bar or space widths. At present, a tolerance of ±0.004 inch is considered to be acceptable for a standard size symbol having a modular width of 0.013 inch. Thus, the most narrow bar or space, which ideally is 0.013 inch in width, will be properly read by the optical scanner if the actual width of the bar or space is between 0.009 inch and 0.017 inch. Similarly, the widest of the bars, which ideally is 0.052 inch, will be properly read by the transducer if its actual width is no less than 0.048 inch nor more than 0.056 inch.

Figure 2:
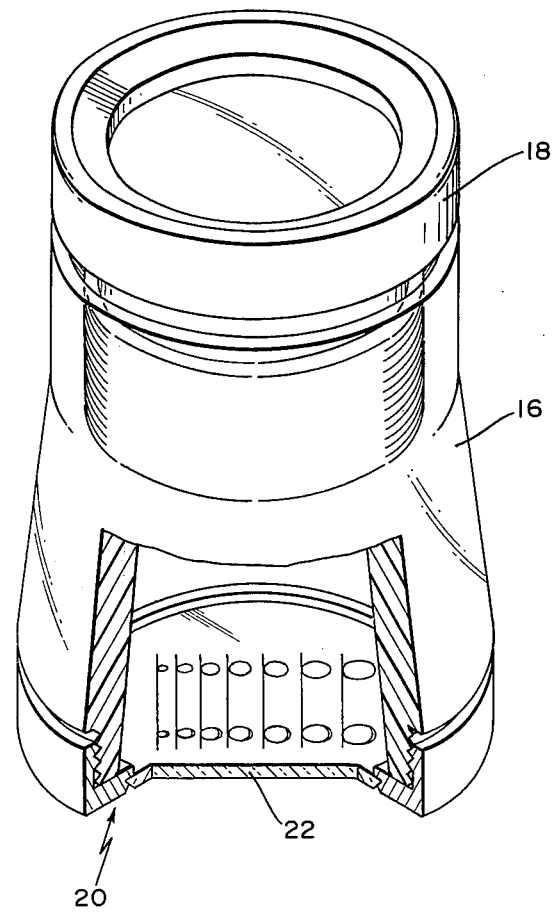
FIG. 2 is an illustration, partly broken away, of a measuring magnifier having a reticle which incorporates the invention.

In accordance with the invention the width of a particular bar or space may be easily and accurately checked to determine whether it falls within the required tolerance range. To this end, a comparative magnifier, shown in FIG. 2, is provided. The magnifier includes a barrel 16 which preferably is made from transparent plastic and is threaded at both ends. The barrel may be flared outwardly in a downward direction as shown. A magnifying eye piece 18 is threaded onto the upper end of the barrel 16 and may be rotated to vary its focus to suit the individual user. A reticle 20 is threaded onto the lower end of the barrel, the reticle 20 including a transparent plate 22 of glass or the like. The glass plate of the reticle is provided with markings, as by imprinting or etching, in accordance with the invention as described below. In use, the measuring magnifier is placed, reticle down, on the symbol.

FIG. 3 shows, greatly enlarged, a preferred configuration for the indicia on the reticle. The indicia includes four comparison groups 24a, 24b, 24c, 24d and may also include additional comparison groups 24e, 24f and 24g. In this embodiment, each of the first four comparison groups 24a–24d is dimensioned to provide a comparative measurement of one of the four predetermined bar or space widths employed in the UPC system. Thus, comparison group 24a is intended to provide measurement of the smallest bar or space width, ideally 0.013 inch for a standard size UPC symbol, and comparison group 24d is intended to provide measurement of the largest bar or space width. Comparison group 24g is intended to provide a comparative measurement of the width of the entire region 15 of seven modules. Comparison groups 24e and 24f, which relate to the fifth and sixth integer multiples of the basic module width have utility in that they can be employed to check the widths of groups of five or six intermediate modules within a region 15.

In the illustrative embodiment each of the comparison groups includes a vertical reference line 26a–26g. A geometric figure, such as a circle 28 is formed on the reticle and coincides with and is tangent to the reference line 26. The circle is dimensioned to define a diameter equal to the ideal line width to which that comparison group relates. For example, circle 28a in comparison group 24a would have a diameter of 0.013 inch. Preferably this diameter is measured across the inside of the circle.

Each comparison group also includes a pair of tolerance or limit characters located along the reference line 26 and spaced from the target circle 28. The tolerance characters may be the same geometrical configuration as the target character 28, e.g., circular, as shown in this embodiment. The pair of tolerance characters includes a maximum diameter circle 30 and a minimum diameter circle 32 within the maximum diameter circle 30. Each of the minimum and maximum diameter circles 30, 32 coincide with each other at a common point of tangency and with a reference point 34 on the reference line. The minimum diameter circle 32 has a diameter which is less than that of the target circle 28 by an amount equal to the minimum tolerance limit (here 0.009 inch) and the maximum diameter circle 32 has a diameter equal to the maximum tolerance beyond that of the target circle 28 (here 0.017 inch). It may be noted further that the maximum and minimum circles 30 and 32 are symmetrical about a horizontal centerline which, while not necessarily included in the reticle markings, is perpendicular to the reference line 26 and intersects the reference point 34. The location of such a centerline is suggested in phantom at 35 in FIG. 3. Each of the other comparison groups formed on the glass 22 of the reticle 20 includes an identical configuration of target circles 28b–28g and an identical configuration of maximum diameter circles 30b–30g and minimum diameter circles 32b–32g. In each pair of minimum/maximum diameter limit circles, their diameters differ by 0.008 inch. The circles 28a–28g all lie along a common horizontal centerline (not shown) and the circles 30a–30g and 32a–32g all also lie along a common horizontal centerline 35 and are symmetrical thereabout.

FIG. 4 is an enlarged illustration, magnified approximately forty times, and illustrating the manner in which the width of a bar in a standard size symbol may be checked. Here, the bar being measured is intended to be of the first order of width, 0.013 inch. The reference line 26a is aligned with one edge of the bar 36 to be measured thus locating the reference point 34 along one edge 37 of the bar. It may then be seen visually whether the other edge 38 of the bar falls between the most distal portions of the maximum/minimum circles 30, 32 thus indicating that the width of the line is within the acceptable tolerances. If the other edge 38 lies outside of the maximum diameter circle 30, as indicated at 39, or lies within the minimum diameter circle 32, as indicated by the line 40, the bar width is outside of the acceptable tolerances.

While the foregoing configuration of indicia is preferred, it may be noted that it is possible to utilize the principles of the invention by reference only to the pair of minimum/maximum circles 30, 32, with the reference line 26 and target circle 28 being omitted. This is illustrated in FIG. 5 from which it may be seen that the reference point 34, where the circles 30, 32 intersect each other and are in tangency, is placed to overlie one edge 37 of the bar 36 being measured. The user may then determine whether the other edge 38 lies within the acceptable tolerances, as shown in the drawing. While this configuration may be employed, it is noted that the use of the reference line 26 is preferred in that it facilitates precision alignment of the edge of the bar with the reference point 34 of the circles 30, 32.

While the invention has been described primarily as employing circles in the comparison groups 24, other geometric configurations may be employed. For example, as shown in FIG. 6, the geometric figures in the pair thereof are each triangular with one side of each of the triangles coinciding with each other and defining a reference region in the form of a line 42 rather than a point as described in the previous embodiment. The apexes 44, 46 of the outer and inner triangles 48, 50 extend to the corresponding minumum and maximum distances from the reference region 42 in the same manner as described with regard to the circular configurations. The triangular configuration may be employed with or without an extended reference line 52.

FIG. 7 shows a further variation in the configuration of the geometric comparison figures in which the figures are of generally elliptical shape, with each figure extending from a vertical line 54 which defines, in part as at 56, a reference line. The most distal portion of each of the outer and inner elliptical figures 58, 60 are spaced from the reference region 56 by an amount equal to the minimum and maximum widths of the bar intended to be measured.

It may be noted that in some instances it may be desired to employ a pair of geometric figures of configurations which are not identical. For example, in some instances it may be desirable to employ a combination of a circle and triangle or the like. In each instance, however, the two geometric figures preferably coincide at at least one point which may serve as a reference point and the most distal portions of the two figures in the pair must correspond to the maximum/minimum acceptable widths of the bar to be measured. It is preferred, although not strictly essential, in all the various embodiments that each of the geometric figures in each pair be of a configuration which converges as it approaches the most distal point of the figure from the reference point or reference line.

Figure 8:
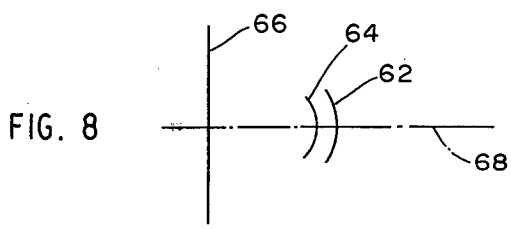
FIG. 8 is an illustration of still another variation of the invention.

FIG. 8 shows still another variation in which the geometric comparison figures are in the form of a pair of spaced lines 62, 64 which are spaced from a reference line 66. Line 64 which is disposed nearer the reference line 66 corresponds to the minimum acceptable width being measured and line 62 which is more distal from reference line 66 corresponds to the maximum acceptable width being measured. The lines 62, 64 preferably are disposed symmetrically about a line which may be imaginary but is shown at 68 in phantom and which extends perpendicular to the reference line 66. The lines 62, 64 may converge toward their most distal points, where they also intersect with their common line of symmetry 68. As mentioned, however, it is not strictly essential that the pair of limit characters 62, 64 converge and a pair of limit characters in the form of a pair of lines may be employed even in a non-converging configuration.

Figure 9:
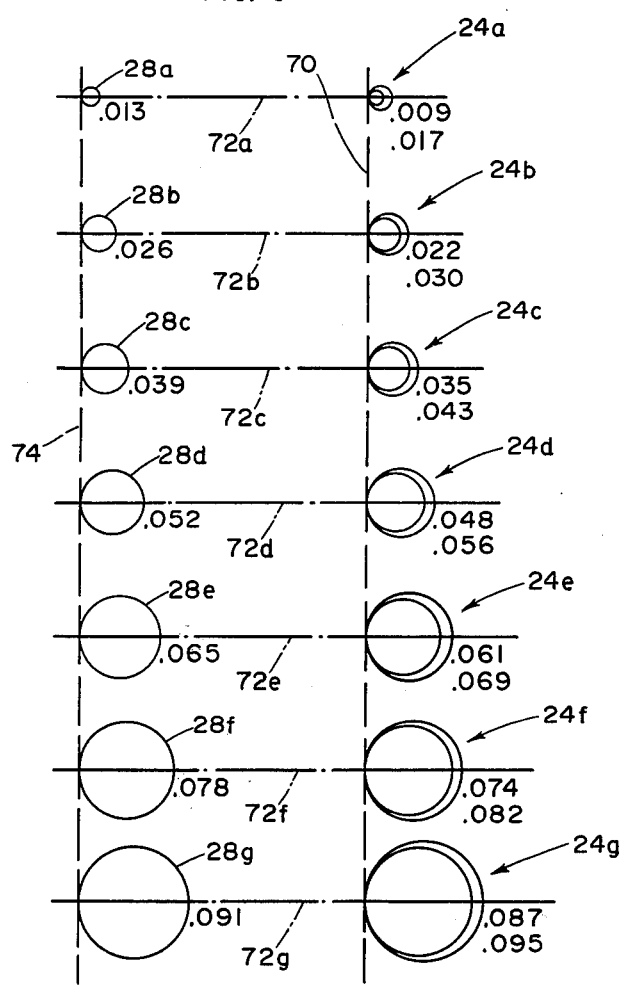
FIG. 9 is an illustration of a variation of the arrangement shown in FIG. 3.

FIG. 9 shows a further variation of the arrangement shown in FIG. 3. In this variation, the comparison groups 24a–24g are arranged in vertically spaced relation with their reference points all being tangent to a common vertical line 70. If desired, each of the comparison groups may be spaced from a corresponding target circle, with each of the target circles 28a–28g being located along the axis of symmetry 72 of their corresponding comparison groups and also being tangent to a common vertical line 74, if desired. With this configuration the common reference line 70 may be aligned with one edge (e.g. 37 in FIG. 5) of the bar to be measured. It may then be seen visually whether the other edge 38 of the bar falls within the minimum/maximum limit characters of any of the comparison groups.

It should be understood that the foregoing description of the invention is intended merely to be illustrative thereof and that other modifications and embodiments may be apparent to those skilled in the art without departing from its spirit.

Having thus described the invention what we desire to claim and secure by Letters Patent is:

1. A measuring magnifier for determining whether the width of a bar of space falls within predetermined tolerances limits comprising:
   a barrel;
   a magnifying lens mounted to one end of the barrel;
   a reticle mounted to the other end of said barrel; and
   indicia formed on said reticle, said indicia including means defining a reference location and a pair of geometrical figures, each of said figures extending away from said reference location in the same general direction, each of said figures having at least a portion located distally from said reference location, the distance between said reference location and the nearer of said distal portions corresponding to the minimum acceptable width of said bar of space to be measured and the distance between said reference region and the the more distal of said distal regions corresponding to the maximum acceptable width of said bar to be measured.

2. A device as defined in claim 1 further comprising: each of said geometrical figures being of a shape in which it converges as it approaches its distal region.

3. A device as defined in claim 1 wherein said geometrical figures are located symmetrically about a common line of symmetry.

4. A device as defined in claim 2 wherein said geometrical figures are of the same configuration and in which one of the figures is disposed within the other of said figures.

5. A device as defined in claim 1 wherein said geometrical figures coincide with each other at the reference location.

6. A device as defined in claim 5 further comprising:
said indicia including at least one reference line;
a circle tangent to the reference line and having a diameter equal to a target dimension which lies within said predetermined tolerance limits;
said geometrical figures comprising circles on the same side of the reference line as the first circle, each of the pair of circles being tangent to each other and a point on the reference line, said point comprising said reference location.

7. A device as defined in claim 6 further comprising:
at least one additional reference line on the reticle parallel to the first mentioned reference line; and
a group of circles tangent to each of said additional lines and arranged identically therewith to the circles tangent to the first reference line, each of said group of circles having diameters related to another target dimension.

8. A reticle for use in a measuring device for determining whether the width of bars or spaces are within prescribed limits comprising:
a transparent glass-like panel;
a plurality of spaced parallel reference lines on the panel; and
at least two circles tangent to and on the same side of each line with the circles tangent to the same reference line having diameters related to the prescribed limits of different bars or spaces to be measured.

9. A reticle as defined in claim 8 further comprising:
the diameters of the circles tangent to the same reference line having diameters equal to the maximum and minimum acceptable prescribed width of the same bar or space to be measured.

10. A reticle as defined in claim 9 further characterized by a third circle tangent to each reference line and having a diameter equal to the intended width of the bar or space being measured.

11. A reticle as defined in claim 8 further characterized by a third circle tangent to each reference line and having a diameter equal to the intended width of the bar or space being measured.

12. A measuring device for evaluating visually whether the widths of imprinted parallel bar or space in a Universal Product Code symbol or the like fall within prescribed standards comprising:
a barrel and a lens mounted on one end thereof, and a reticle mounted on the other end thereof, said reticle including at least one reference line;
a pair of circles tangent to the reference line on the same side thereof, each of said circles being of different diameter;
one of said circles having a diameter greater by a predetermined distance than the intended width of a selected bar or space in said symbol and the other circle having a diameter less, by said predetermined distance, than the intended width of the same bar or space in said symbol.

13. A measuring device as defined in claim 12 further comprising:
a reference line imprinted on said reticle; and
said circles being tangent to said reference line and tangent to each other at a reference point.

14. A measuring device as defined in claim 9 further comprising:
a third circle tangent to the reference line and on the same side thereof as the other circles tangent to said reference line; and
said third circle having a diameter equal to the intended width of the same bar or space in said symbol being measured.

15. A measuring device as defined in claim 14 further comprising:
a plurality of additional reference lines on the reticle, each parallel to the first reference line, each additional reference line being tangent to a pair of additional circles, said additional circles being tangent to each other and to their associated reference lines and having diameters which are respectively more or less wide, by a predetermined distance, than the intended width of another bar or space in said symbol, each of said additional reference lines having a third circle tangent to it and having a diameter equal to the intended width of said other bar or space in said symbol.

16. A method for visually determining whether the width of a bar or space falls within prescribed tolerances comprising:
providing an outline of a first geometric figure;
providing an outline of a second geometric figure;
placing said first and second geometric figures in overlying relation to said bar or space to be measured with at least a portion of an edge of each of said figures coinciding with said edge of said bar or space, said geometric figures being of predetermined dimensions in which one of said figures corresponds to the minimum acceptable width and the other of said figures corresponds to the maximum acceptable width, said figures further being placed so that said figures have a common overlapping reference point at said region in which they overlap said edge of said bar or space; and
visually determining whether the opposite edge of said bar or space extends through one, both or neither of said geometric figures.

17. A measuring device for determining whether the width of a bar or space lies within prescribed limits comprising:
a transparent panel;
a reference line formed on the panel;
a plurality of comparison groups formed on the panel, each of the comparison groups including a pair of geometric figures spaced from each other and from the reference line, the geometric figure disposed nearer the reference line corresponding to the minimum acceptable width of said bar or space to be measured and the more distal of the geometric figures corresponding to the maximum acceptable width of said bar or space to be measured;
each pair of geometrical figures being spaced by different increments from the reference line; and
each pair of geometrical figures being spaced from the other pairs of geometrical figures along a direction which parallels the reference line.

18. A device as defined in claim 17 wherein said transparent panel comprises a reticle constructed and arranged to be mounted in a measuring magnifier.

19. A measuring device as defined in claim 17 wherein the geometric figures each are of a configuration in which they converge as they approach their respective distal regions.

20. A method for visually determining whether the width of a bar or space falls within prescribed tolerances comprising:

providing a transparent panel having a reference region formed thereon and a pair of geometric figures formed thereon in spaced relation to each other and to said reference region, the geometric figure nearer to the reference line corresponding to the minimum acceptable width of the bar or space to be measured and the geometric figure more distal from the reference line corresponding to the maximum acceptable width of said bar or space;

placing said transparent panel over said bar or space to be measured so that the reference region overlies one edge of the bar or space to be measured; and visually determining whether the opposite edge of the bar or space extends within the space defined by the first and second geometric figures.

21. A method for visually determining whether the width of a bar or space falls within prescribed tolerances comprising:

providing a transparent panel having a reference line formed thereon and a plurality of comparison groups formed thereon, each of the comparison groups including a pair of geometric figures spaced from each other and from the reference line, the geometric figures in each comparison group which is disposed nearer the reference line corresponding to a minimum acceptable width of said bar or space to be measured and the more distal of the geometric figures in that comparison group corresponding to the maximum acceptable width of said bar or space to be measured, each of the comparison groups being spaced by different increments from the reference line, and each comparison group also being spaced from each of the other comparison groups along a direction which parallels the reference line;

placing said panel in overlying relation to the bar or space to be measured with the reference line in alignment with one edge of the bar or space to be measured; and visually determining whether the opposite edge of the bar or space being measured extends between any pair of geometrical figures in any of the comparison groups.

22. A measuring magnifier for determining whether the width of a bar of space falls within predetermined tolerances limits comprising:

a barrel;

a magnifying lens mounted to one end of the barrel;

a recticle mounted to the other end of said barrel; and indicia formed on said recticle, said indicia including means defining a reference location and a pair of geometrical figures, each of said figures being spaced from said reference location in the same general direction, each of said figures having at least a portion located distally from said reference location, at least the distal portions of each of said figures being spaced from each other, the distance between said reference location and the distal portion of the nearer of said figures corresponding to the minimum acceptable width of said bar or space to be measured and the distance between said reference locacation and the distal portion of the more distal of said figures corresponding to the maximum acceptable width of said bar or space to be measured.

* * * * *